Figure 1:
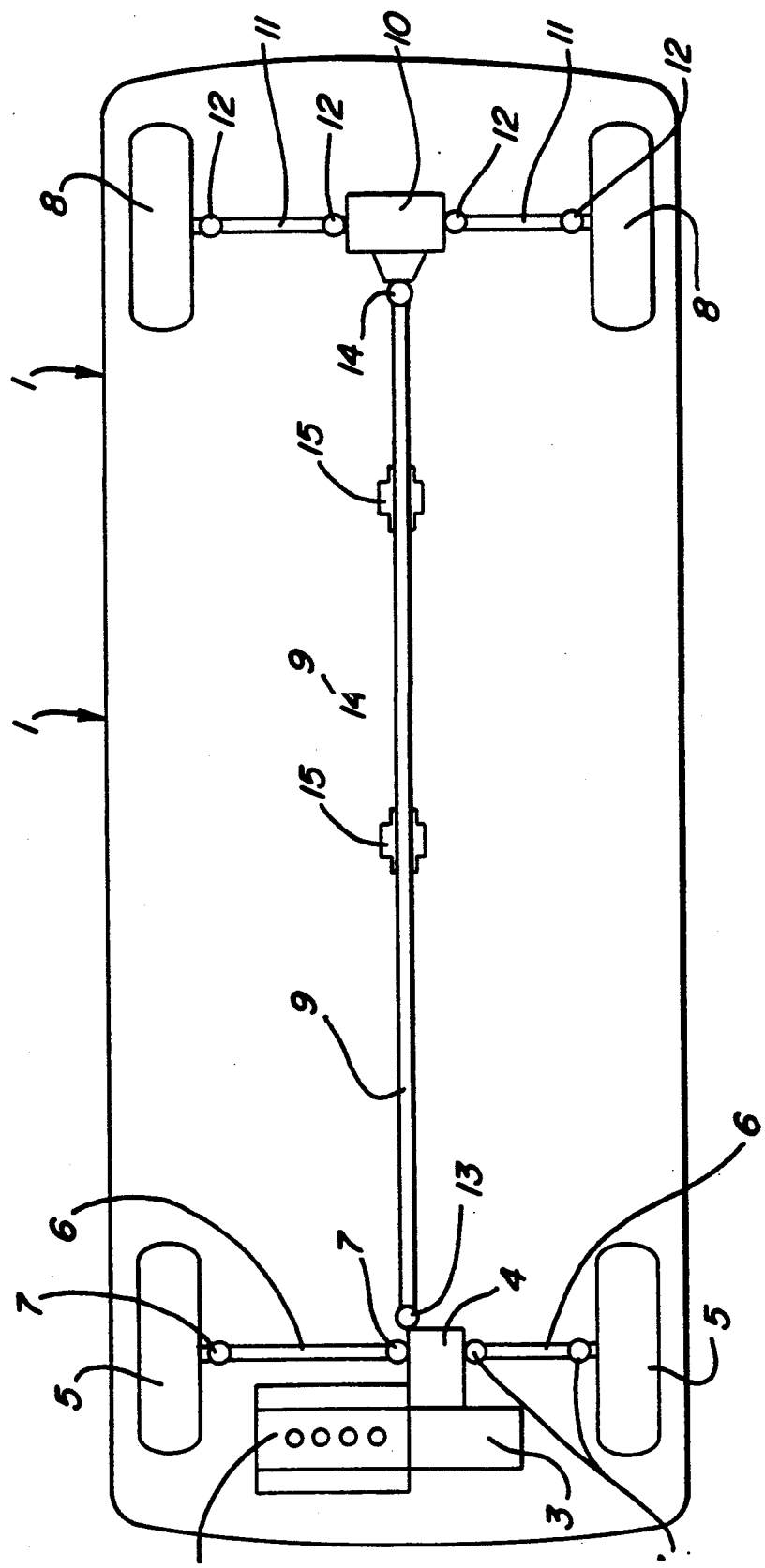

United States Patent [19]
Damian

[11] Patent Number: 5,145,025
[45] Date of Patent: Sep. 8, 1992

[54] VIBRATION DAMPER AT A DRIVESHAFT

[76] Inventor: Karl Damian, Taunusstrasse 52, 6054 Rodgau, Fed. Rep. of Germany, 3

[21] Appl. No.: 643,045

[22] Filed: Jan. 18, 1991

[30] Foreign Application Priority Data

Feb. 7, 1990 [DE] Fed. Rep. of Germany ....... 4003601

[51] Int. Cl.$^5$ .............................................. B60K 17/00
[52] U.S. Cl. ..................................... 180/381; 180/382
[58] Field of Search ......................... 180/381, 382, 379

[56] References Cited

U.S. PATENT DOCUMENTS

| | | | |
|---|---|---|---|
| 2,465,785 | 3/1949 | Berno | 180/381 |
| 2,857,974 | 10/1958 | Heller | 180/381 |
| 2,930,660 | 3/1960 | Dunn | 180/381 |
| 2,963,106 | 12/1960 | Sampietro | 180/381 |

FOREIGN PATENT DOCUMENTS

| | | |
|---|---|---|
| 1178303 | 5/1965 | Fed. Rep. of Germany . |
| 2610212 | 9/1977 | Fed. Rep. of Germany . |
| 2744040 | 4/1979 | Fed. Rep. of Germany . |
| 3128619 | 4/1982 | Fed. Rep. of Germany ...... 180/381 |

*Primary Examiner*—Kenneth R. Rice
*Attorney, Agent, or Firm*—Harness, Dickey & Pierce

[57] ABSTRACT

The invention relates to a vibration damper 15 for a driveshaft 9 having a tubular or solid shaft and bearing means connected to the vehicle 1 via a rubber coupling. The object of the vibration damper 15 is to reduce the bending vibrations and, at the same time, to eliminate balancing problems of the known damper masses. To achieve the objective it is proposed that the vibration damper 15 should be freely vibratingly connected to a non-rotating part of the bearing means. In this way, the vibration damper 15 is not subjected to any rotation and ensures that the bending vibrations of the driveshaft 9 are reduced.

7 Claims, 2 Drawing Sheets

VIBRATION DAMPER AT A DRIVESHAFT

The invention relates to a vibration damper at a driveshaft, especially at a two- or multi-component propeller shaft of a motor vehicle for transmitting driving torque, having joints provided at its ends and a tubular or solid shaft which connects the two joints and which is supported by bearing means, with a part of the bearing means being flexibly held by a rubber coupling relative to a fixed part of the motor vehicle.

As a result of unbalanced inertia forces and inertia moments of the rotating engine parts, rotational vibrations of the engine-gearbox system and resilient balancing movements of the vehicle relative to the drive assembly, the driveshafts of a motor vehicle are subject to continuous loads due to rotational and bending vibrations. The vibrations in the resonance range of the driveshaft are characterised by particularly high amplitudes, as a result of which the bearing parts and joints are subjected to particularly high loads. Furthermore, the vibrations lead to interfering noise in the vehicle interior.

To reduce the bending vibrations, DE 11 81 560 B proposes that inside the tubular shaft, there should be arranged a cylindrical metal body whose two ends are connected to the tubular driveshaft by rubber discs. However, this measure is limited to tubular shafts and involves further rotating damper masses which, in turn, may lead to out-of-balance of the propeller shaft.

It is the object of the present invention to provide a vibration damper which reduces the bending vibrations of a driveshaft and eliminates the balancing problems of known damper masses.

In accordance with the invention, the vibration damper is freely vibratingly connected to the non-rotating part of the bearing means, which is held by the rubber coupling.

The freely vibrating connection between the vibration damper and the non-rotating part of the bearing means leads to a non-rotating balancing mass so that the driveshaft is not subjected to any additional out-of-balance. Furthermore, the vibration damper reduces the bending vibrations especially in the region of the bearing means, thereby prolonging their service life. At the same time, as a result of the rubber coupling between the bearing means and the vehicle body, the transmission of vibrations to the vehicle is avoided. The vibration damper may consist of several circumferentially distributed elements or an annular, coaxially arranged element. The elements may be provided in the form of absorbers which may be connected via springs or flexible rubber couplings to the outer ball bearing race of the intermediate bearing, with the absorber mass being adjusted to the respective natural frequency of the driveshaft. This measure leads to an effective reduction in the bending vibrations occurring.

An embodiment of the vibration damper in accordance with the invention and an example of its application are illustrated in the drawings wherein FIG. 1 shows a motor vehicle having a driveshaft and bearing means provided with a vibration damper.

Figure 2:
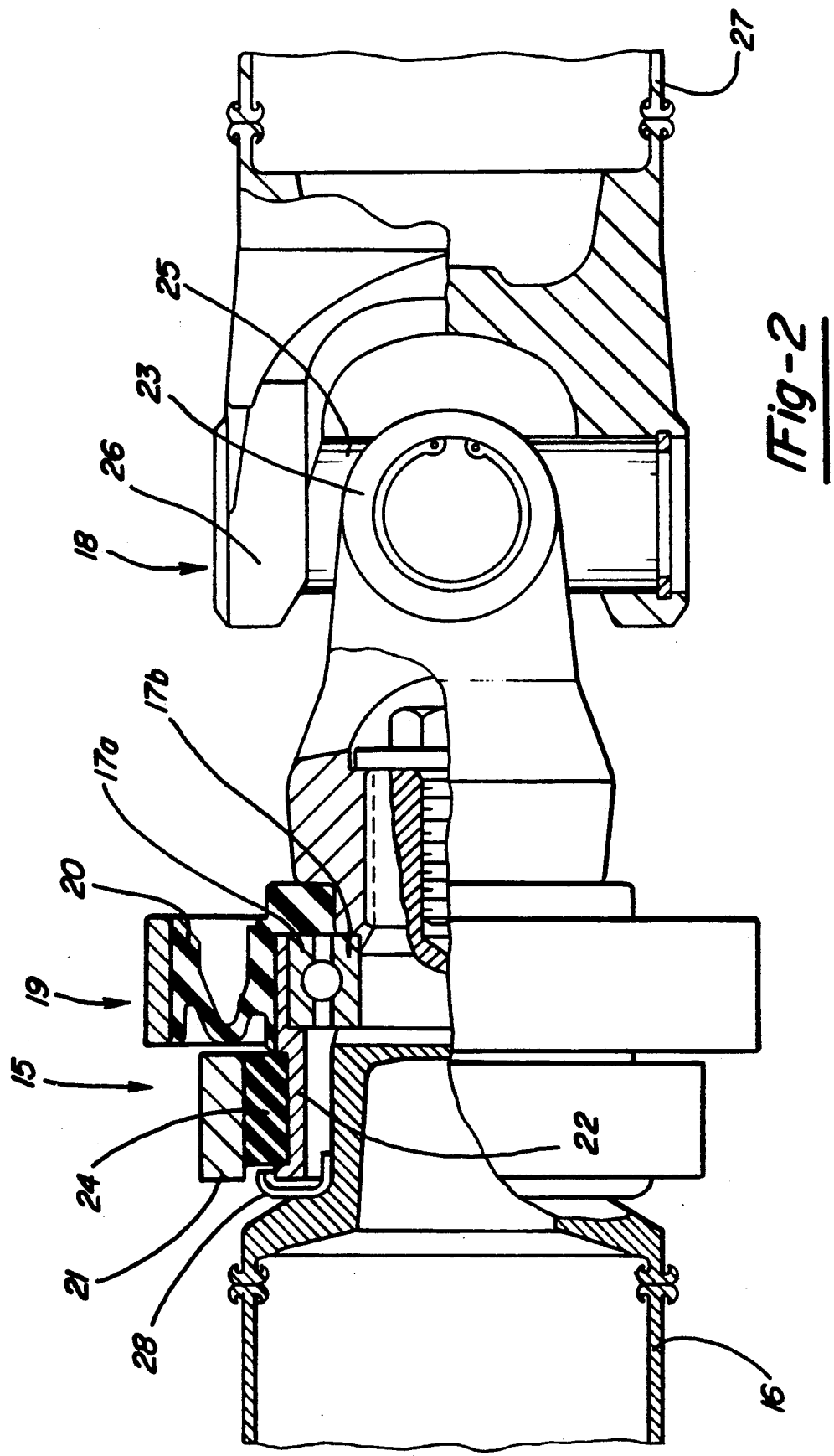

FIG. 2 shows an embodiment of bearing means provided with a vibration damper in accordance with the invention.

FIG. 1 shows a four wheel drive vehicle 1 which, via a front engine 2, a gearbox 3 and a front axle differential 4, drives the front wheels 5 via front side shafts 6. At their ends towards the front axle differential 4 and the front wheels 5, the side shafts 6 comprise joints 7. The driving torque for the rear wheels 8 is branched off the front axle differential 4 and passed on to a rear axle differential 10 via a propeller shaft 9. The rear axle differential 10 is connected to the rear wheels 8 via rear differential 11 and joints 12. The propeller shaft 9, at its ends, also comprises joints 13, 14 and is supported relative to the vehicle 1 by an intermediate bearing 17 provided with a vibration damper 15.

FIG. 2 shows part of a propeller shaft 9 having an intermediate bearing 19 and a central joint 18 as well as a vibration damper 15 in accordance with the invention.

Of the propeller shaft 9 there is illustrated only part of the tubular shaft 16 which, with its tapered end, is inserted into an intermediate bearing 19 consisting of a ball bearing 17 and a rubber diaphragm 20. The ball bearing 17 with its outer ball bearing race 17a is connected to the vehicle 1 via the rubber diaphragm 20. The tubular shaft 16 is held with its tapered end in the inner ball bearing race 17b and carries a joint yoke 23 of a central joint 18 which, via a joint cross member 25, is connected to the joint yoke 26 of the second tubular shaft 27.

Via a spring, the absorber mass of the vibration damper 16 is connected in a coaxially arranged ring 22 which is fixed directly to the outer ball bearing race 17a. Further means of fixing the absorber 21 may consist of rubber-elastic coupling means 24 provided at the ring 22 coaxially arranged at the intermediate bearing 19. A seal 28 connected to the tubular shaft 16 prevents dirt particles from penetrating into the ball bearing 17.

On the one hand, the non-rotating vibration absorber 15 reduces the bending vibrations of the driveshaft 9 and on the other hand, it avoids further out-of-balance of the driveshaft 9 capable of vibration.

LIST OF REFERENCE NUMBERS

| | |
|---|---|
| 1 | motor vehicle |
| 2 | front engine |
| 3 | gearbox |
| 4 | front axle differential |
| 5 | front wheel |
| 6 | side shafts |
| 7 | joints |
| 8 | rear wheel |
| 9 | propeller shaft |
| 10 | rear axle differential |
| 11 | side shaft |
| 12 | joint |
| 13 | joint |
| 14 | joint |
| 15 | vibration damper |
| 16 | tubular shaft |
| 17 | ball bearing |
| 17a | outer ball bearing race |
| 17b | inner ball bearing race |
| 18 | central joint |
| 19 | intermediate bearing |
| 20 | rubber diaphragm |
| 21 | absorber |
| 22 | ring of vibration damper |
| 23 | joint yoke |
| 24 | spring |
| 25 | cross member of joint |
| 26 | joint yoke |
| 27 | tubular shaft |
| 28 | seal |

I claim:

1. A vibration damper comprising:

bearing means for rotatably supporting a shaft, said bearing means including an annular outer race coaxially positioned about the shaft;

annular absorber radially affixed about said outer race and being coaxial with said shaft;

coupling means for flexibly coupling said vibration damper with a vehicle, said coupling means including an annular housing coaxially positioned about the shaft and fixed to the vehicle and a diaphragm coaxially positioned between and secured with said housing and said outer race housing for providing flexibility.

2. A vibration damper according to claim 1, wherein said coupling means is circumferentially distributed about said bearing means.

3. A vibration damper according to claim 1, wherein mass of the absorber is adjusted to the natural frequency of the shaft.

4. The vibration damper according to claim 1, further comprising sealing means for sealing said outer race with the shaft.

5. The vibration damper according to claim 1, wherein said absorber includes a ring circumferentially fixed to said outer race and extending substantially parallel to the shaft and a mass retained on said ring by spring means.

6. The vibration damper according to claim 1, wherein said absorber includes a ring circumferentially fixed to said outer race and extending substantially parallel to the shaft and a mass retainer on said ring by spring means on said ring by a flexible rubber coupling.

7. The vibration damper according to claim 1, wherein said absorber includes a ring circumferentially fixed about said outer race and extending substantially parallel to the shaft and said rubber diaphragm circumferentially coupled directly to said ring.

* * * * *